(12) United States Patent
Kim et al.

(10) Patent No.: US 8,090,970 B2
(45) Date of Patent: Jan. 3, 2012

(54) APPARATUS AND METHOD FOR PLAYING MULTIMEDIA DATA

(75) Inventors: Hyo-June Kim, Seoul (KR); Chul-Min Park, Gyeonggi-do (KR); Sung-Yeob Cho, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 3 days.

(21) Appl. No.: 12/848,710

(22) Filed: Aug. 2, 2010

(65) Prior Publication Data

US 2011/0029707 A1 Feb. 3, 2011

(30) Foreign Application Priority Data

Aug. 3, 2009 (KR) .................. 10-2009-0071235

(51) Int. Cl.
*G06F 1/00* (2006.01)
*G06F 13/38* (2006.01)

(52) U.S. Cl. .............................. 713/324; 710/62; 710/72

(58) Field of Classification Search .............. 710/62–74; 713/300–324
See application file for complete search history.

(56) References Cited

U.S. PATENT DOCUMENTS 7,814,489 B2 * 10/2010 Uemura et al. ............... 718/103
2006/0195709 A1 * 8/2006 Matsumoto ................... 713/300
2008/0178027 A1 * 7/2008 Kishimoto et al. ........... 713/323
2008/0178030 A1 * 7/2008 Koizumi ....................... 713/324
2008/0184052 A1 * 7/2008 Itoh et al. ..................... 713/324
2009/0150697 A1 * 6/2009 Yang ............................ 713/323
2011/0029707 A1 * 2/2011 Kim et al. ..................... 710/260

FOREIGN PATENT DOCUMENTS

JP 8-161245 A 6/1996

* cited by examiner

*Primary Examiner* — Christopher B Shin
(74) *Attorney, Agent, or Firm* — Birch, Stewart, Kolasch & Birch, LLP

(57) ABSTRACT

A multimedia data reproducing device is provided which includes: a codec converting digital data into an analog signal by a predetermined method and reproducing the analog signal; and a control unit including a core generating a reproduction block by decoding multimedia data and outputting the generated reproduction block to a main memory in an activated state and an interface transmitting the reproduction block stored in the main memory as the digital data to the codec and transmitting the multimedia data stored in an auxiliary memory to the core in an activated state. Accordingly, it is possible to efficiently reproduce multimedia data to reduce the power consumption of a battery by alternately turning on and off a power source of blocks other than the interface in the control unit periodically or depending on a predetermined situation.

15 Claims, 6 Drawing Sheets

APPARATUS AND METHOD FOR PLAYING MULTIMEDIA DATA

CROSS REFERENCE

This application is based on and claims priority under 5 USC 119 from Korean Patent Application No. 10-2009-0071235, filed on Aug. 3, 2009.

BACKGROUND

1. Field of the Invention

The present invention relates to a device and a method of efficiently reproducing multimedia data.

2. Description of the Related Art

Recently, portable terminals such as a mobile communication terminal, a portable multimedia player (PMP), a personal digital assistant (PDA), and an MP3 player have been used more and more.

Such portable terminals provide various optional services such as a voice call service, a game service, a short messaging service, a wireless Internet service, an E-mail service, a music play service, a video play service, and a camera photographing service.

One main issue in the portable terminals is a problem with an extension in usage time, that is, efficient power consumption of a battery. As the portable terminals decrease in weight, thickness, and size, batteries also decrease in size and capacity. Accordingly, it is necessary to increase the usage time of the portable terminals by efficiently using the batteries.

A structure in which a clock speed is adjusted to reduce the power consumption of the battery is often employed.

FIG. 1 is a graph illustrating leakage current of semiconductor processes. Referring to FIG. 1, graph 10 corresponding to a 80 nm semiconductor process represents an increasing function in which the relation of the clock speed and the leakage current has a right-upper increasing slope. That is, when a product manufactured in the 80 nm semiconductor process is used, the leakage current is reduced by adjusting the clock speed to be lower, thereby reducing the power consumption.

However, in graph 20 or 30 corresponding to a finer semiconductor process such as a 65 nm semiconductor process or a 40 nm semiconductor process, the variation of the leakage current with the variation in clock speed is not great. Even by adjusting the clock speed, the variation in magnitude of the leakage current is not great, thereby hardly affecting the power consumption.

That is, as the semiconductor process becomes finer, the structure for reducing the power consumption with the clock speed becomes more inefficient.

The above-mentioned background art is technical information which is thought out to make the invention or is learned in the course of making the invention by the inventor, and cannot be thus said to be technical information known to the public before filing the invention.

SUMMARY

Therefore, an advantage of some aspects of the invention is that it provides multimedia data reproducing device and method which can efficiently reproduce multimedia data to reduce the power consumption of a battery by alternately turning on and off a power source of blocks other than an interface in a control unit periodically or depending on a predetermined situation and which can be applied to a product manufactured from a fine semiconductor process.

Another advantage of some aspects of the invention is that it provides multimedia data reproducing device and method which can efficiently reproduce multimedia data to reduce the power consumption of a battery by selectively employing a method of raising or lowering the clock speed depending on a semiconductor process or a characteristic of a portable terminal and a method of turning on or off the power source of a core.

According to an aspect of the invention, there is provided a multimedia data reproducing device including: a codec converting transmitted digital data into an analog signal by a predetermined method and reproducing the analog signal; and a control unit including a core generating a reproduction block by decoding multimedia data and outputting the generated reproduction block to a main memory in an activated state and an interface transmitting the reproduction block stored in the main memory as the digital data to the codec and transmitting the multimedia data stored in an auxiliary memory to the core in an activated state.

The power sources of the core and the interface may be turned on when the control unit is in an activated state and only the power source of the interface may be turned on to reduce the power consumption when the control unit is in a deactivated state.

The control unit or the interface unit may generate an interrupt signal periodically alternating between an activated state and a deactivated state.

Alternatively, the control unit or the interface may generate an interrupt signal periodically alternating between an activated state and a deactivated state depending on an amount of the reproduction block remaining in the main memory.

Alternatively, the control unit or the interface may generate an interrupt signal periodically alternating between an activated state and a deactivated state depending on a transmission rate of the reproduction block from the main memory to the codec.

The core may further include an interrupt module which is turned on even when the power source of the core is turned off, and the interrupt module may turn on the power source of the core in response to the interrupt signal.

Alternatively, the control unit may turn on the power source of the core in response to the interrupt signal.

The interface may transmit the reproduction block stored in the main memory to the codec even when the control unit is in a deactivated state.

The main memory may be a volatile memory.

The auxiliary memory may be a nonvolatile memory.

The control unit may select one of a clock speed control method and a core power source control method depending on a semiconductor process or a characteristic of a portable terminal including the multimedia data reproducing device.

According to another aspect of the invention, there are provided a multimedia data reproducing method in a multimedia data reproducing device and a program for carrying out the method.

The multimedia data reproducing method includes: (a) setting a control unit to an activated state; (b) causing an interface to read multimedia data stored in an auxiliary memory and transmit the read multimedia data to a core; (c) causing the core to generate a reproduction block by decoding the multimedia data and to output the reproduction block to a main memory; (d) setting the control unit to a deactivated state; (e) transmitting the reproduction block stored in the main memory to a codec; and (f) causing the codec to reproduce the reproduction block.

The time of performing the steps of (b) to (c) may be shorter than the time of performing the steps of (e) to (f).

The multimedia data reproducing method may further include: (g) determining whether the reproduction block is a last reproduction block stored in the main memory; (h) checking whether a request for switch to an activated state is given when it is determined in the step of (g) that the reproduction block is not the last reproduction block; and (i) performing the step of (a) again when the request is given.

The multimedia data reproducing method may further include: (g) determining whether the reproduction block is a last reproduction block in a multimedia file including the multimedia data; (h) checking whether a request for switch to an activated state is given when it is determined in the step of (g) that the reproduction block is not the last reproduction block; and (i) performing the step of (a) again when the request is given.

The multimedia data reproducing method may further include: (g) determining whether the reproduction block is a last reproduction block in a reproduction list including the multimedia data; (h) checking whether a request for switch to an activated state is given when it is determined in the step of (g) that the reproduction block is not the last reproduction block; and (i) performing the step of (a) again when the request is given.

The step of (a) may be performed in response to an interrupt signal periodically generated and output by the control unit or the interface.

The step of (a) may be performed in response to an interrupt signal generated and output by the control unit or the interface depending on an amount of reproduction block remaining in the main memory or a transmission rate of the reproduction block to the codec.

Other aspects, features, and advantages of the invention will become apparent from the accompanying drawings, the appended claims, and the detailed description.

According to the aspects of the invention, it is possible to efficiently reproduce multimedia data to reduce the power consumption of a battery by alternately turning on and off a power source of blocks other than an interface in a control unit periodically or depending on a predetermined situation and it is possible to employ a product manufactured from a fine semiconductor process. That is, it is possible to efficiently reduce the power consumption of the portable terminals such as a mobile communication terminal, a PMP, a PDA, and a MP3 player.

Since the main memory of a portable terminal can be used, a particularly buffer is not necessary and thus it is advantageous in cost.

It is also possible to efficiently reproduce multimedia data to reduce the power consumption of a battery by selectively employing a method of raising or lowering the clock speed depending on a semiconductor process or a characteristic of a portable terminal and a method of turning on or off the power source of a core.

DESCRIPTION OF EXEMPLARY EMBODIMENTS

Figure 1:
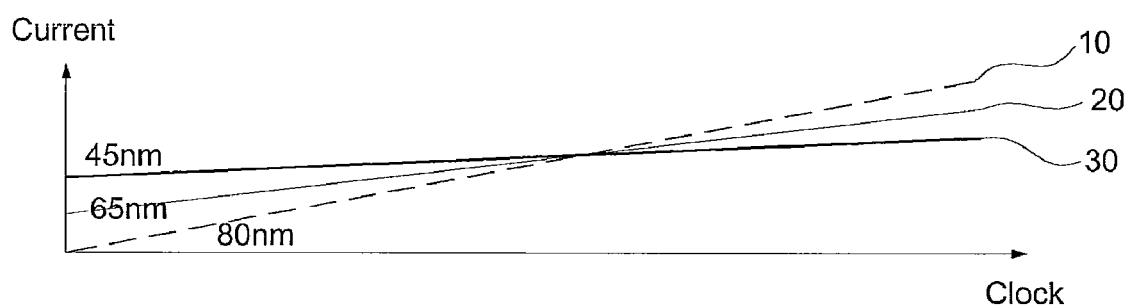
FIG. 1 is a graph illustrating leakage current of semiconductor processes.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

The exemplary embodiments of the invention will be described now in detail with reference to the accompanying drawings.

Figure 2:
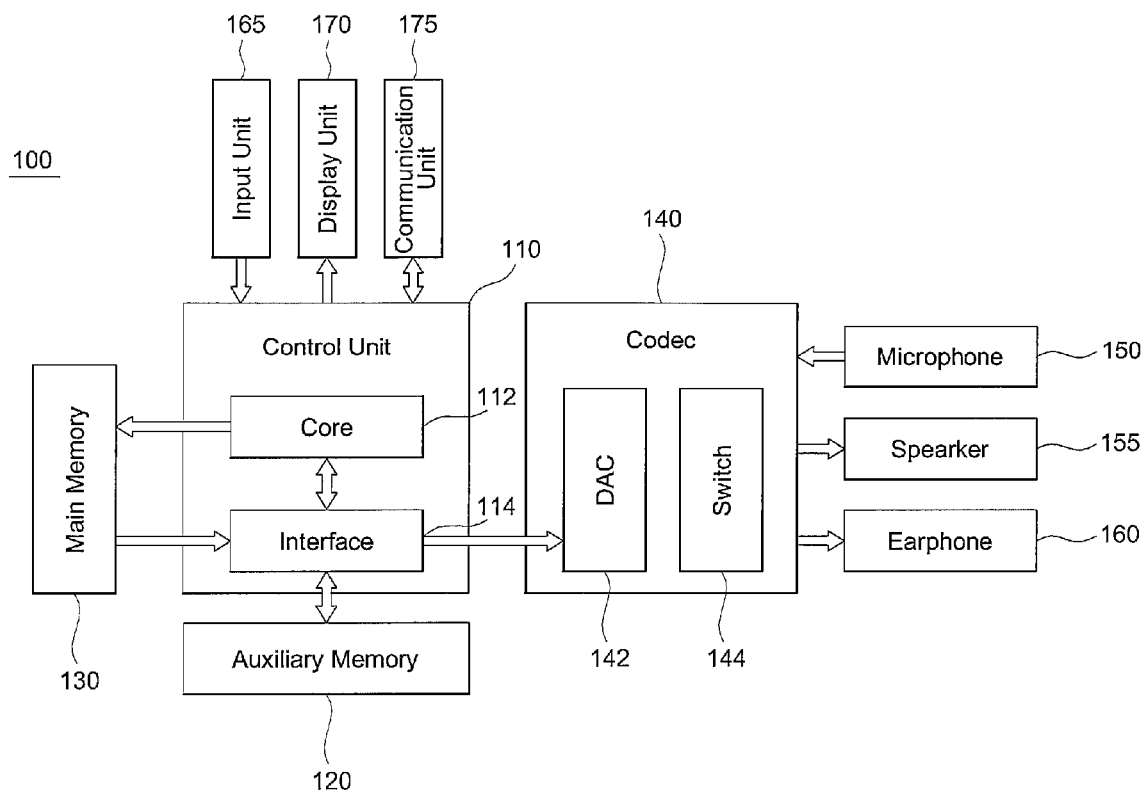
FIG. 2 is a block diagram schematically illustrating the configuration of a portable terminal including a multimedia data reproducing device according to an exemplary embodiment of the invention.
Figure 3:
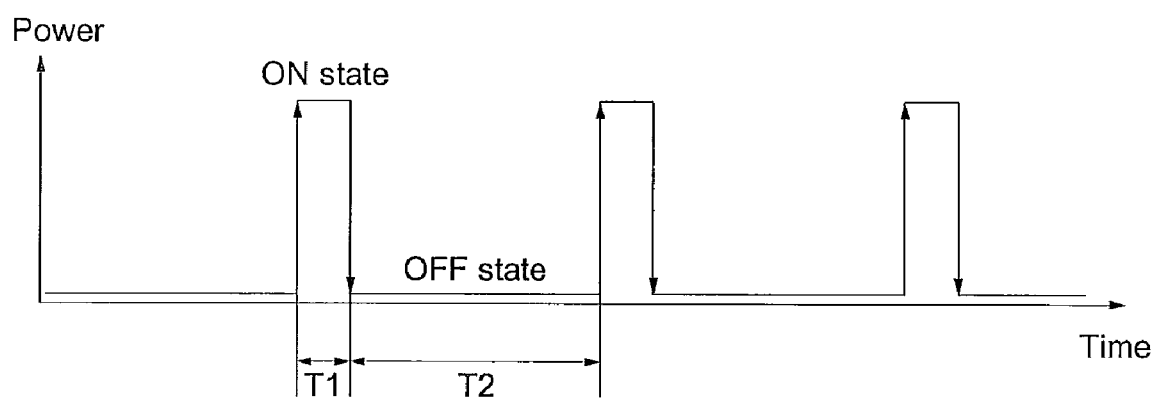
FIG. 3 is a graph illustrating a temporal state variation of a core included in the multimedia data reproducing device according to the exemplary embodiment of the invention.
Figure 4:
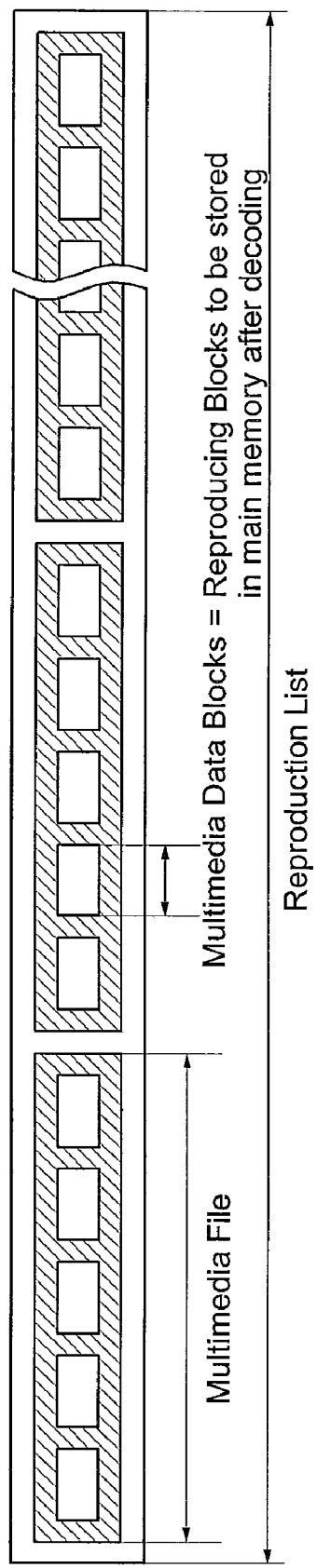
FIG. 4 is a diagram illustrating the structure of multimedia data stored in an auxiliary memory according to an exemplary embodiment of the invention.

FIG. 2 is a block diagram schematically illustrating the configuration of a portable terminal including a multimedia data reproducing device according to an exemplary embodiment of the invention. FIG. 3 is a graph illustrating a temporal state variation of a core included in the multimedia data reproducing device according to the exemplary embodiment of the invention. FIG. 4 is a diagram illustrating the structure of multimedia data stored in an auxiliary memory according to an exemplary embodiment of the invention.

Referring to FIG. 2, a portable terminal 100, a control unit 110, a core 112, an interface 114, a main memory 130, an auxiliary memory 120, a codec 140, a digital/analog converter 142, a switch 144, an input unit 165, a display unit 170, a communication unit 175, a microphone 150, a speaker 155, and an earphone 160 are shown. It is assumed in an exemplary embodiment of the invention that the portable terminal 100 is a mobile communication terminal, but the scope of the invention is not limited to this assumption.

A multimedia data reproducing device according to this exemplary embodiment is included in the portable terminal 100, stores reproduction blocks each obtained by decoding a predetermined amount of multimedia data stored in the auxiliary memory 120 in the main memory 130, and transmits the reproduction blocks stored in the main memory 130 to the codec 140 for reproduction. Here, when the power source of the core 112 is turned on, unnecessary power consumption is caused. Accordingly, by turning on the power source of the core 112 only if necessary and turning off the power source of the core 112 in the most time to reduce the power consumption, the portable terminal 100 may have an efficient structure which can save power.

The control unit 110 includes a core 112 and an interface 114, controls the elements of the portable terminal 100, and processes various data so as to enable the portable terminal 100 to perform general functions. In this embodiment, the processing of multimedia data will be mainly exemplified.

The core 112 generates reproduction blocks by decoding multimedia data and outputs the generated reproduction blocks. The multimedia data may be a multimedia file or a part of the multimedia file which is encoded by a predetermined method and stored in the auxiliary memory 120. The reproduction blocks generated by the core 112 are output to the main memory 130 connected to the core 112 and are stored in the main memory 130.

In this embodiment, when the control unit 110 is in an activated (waked up) state, the core 112 decodes the multimedia data in an ON state where the power source of the core 112 is turned on. When the control unit 110 is in a deactivated (sleep) state, the core 112 reproduces the multimedia data in an OFF state where the power source of the core 112 is turned off.

The core 112 may include an interrupt module therein. When the core 112 is in the OFF state, the interrupt module is kept in the ON state, receives an interrupt signal generated by the control unit 110 or the interface 114, and switches the mode of the core 112 to the ON state.

Alternatively, the core 112 may include but may not use the interrupt module, or may not include the interrupt module. The control unit 110 controls the power source of the core 112 in response to an internal interrupt signal or the interrupt signal from the interface 114 to switch the mode of the core 112 between the ON state and the OFF state.

Referring to FIG. 3, the core 112 is alternately switched to the ON state and the OFF state with a constant period. It can be seen that the power consumption is great in the ON state, but the power consumption is almost zero in the OFF state.

The core 112 decodes the multimedia data transmitted from the interface 114 to generate the reproduction blocks in the ON state, and blocks other than the interrupt module do not work when the interrupt module works in the OFF state, thereby minimizing the power consumption.

The core 112 may be switched to the OFF state automatically after the ON state is maintained for a predetermined time or when a particular interrupt signal is received. The particular interrupt signal may be generated and output by the control unit 110 or the interface 114.

Here, the time when the core 112 is in the ON state is shorter than that when the core 112 is in the OFF state. As shown in FIG. 3, the core may alternately have the ON state of T1 and the OFF state of T2. Here, T1 is much shorter than T2. For example, T1 may be 0.1 seconds and T2 may be 9.9 seconds. At this time, the reproduction time of 5 minutes in total may include 30 periods, the time in the ON state may be 3 seconds, and the time in the OFF state is 4 minutes and 57 seconds.

In this embodiment, the core 112 may be a direct processing circuit such as an ARM which can decode data by software or a direct processing circuit such as a DSP which can decode data by hardware.

The interface 114 transmits the reproduction blocks stored in the main memory 130 to the codec 140 in the subsequent stage and the codec 140 converts the reproduction blocks into analog signals and reproduces the reproduction blocks. Here, the operation of transmitting the reproduction blocks stored in the main memory 130 to the codec 140 may be performed when the core 112 is in the OFF state or regardless of the state of the core 112.

When the core 112 is in the ON state, the interface 114 transmits the multimedia data stored in the auxiliary memory 120 to the core 112 and the core 112 decodes the multimedia data.

In this embodiment, the control unit 110 controls all the blocks other than the interface 114 in addition to the core 112 to alternately be in the ON state and the OFF state.

In the past, the power source of the control unit 110 was turned on or off as a whole and thus all the elements thereof were in the ON state or the OFF state at the same time. To cause the codec 140 to reproduce the multimedia data, the interface 114 should be always in the ON state and the overall elements of the control unit 110 including the interface 114 should be in the ON state at the same, whereby the power was unnecessarily consumed.

However, in this embodiment, only the power source of the interface 114 performing a designated function is turned on when the control unit 110 is in the deactivated state, thereby minimizing the power consumption.

Particularly, the control unit 110 controls the core 112 to be alternately in the ON state and the OFF state. The control unit 110 or the interface 114 outputs the interrupt signal so that the core 112 in the OFF state is in the ON state for a predetermined time.

The control unit 110 or the interface 114 may generate and output a particular interrupt signal for switching the core 112 to the OFF state again when a predetermined time passes after generating and outputting the interrupt signal for switching the core 112 to the ON state.

The interrupt signal may be output periodically with a predetermined period or non-periodically depending on an amount of reproduction blocks remaining in the main memory 130 or a transmission rate of the reproduction blocks transmitted from the main memory 130 to the codec 140.

When the interrupt signal is output periodically, the interrupt signal for switching the core 112 to the OFF state may be generated and output with a predetermined period (for example, 10 seconds).

Alternatively, when the interrupt signal is output non-periodically and the amount of reproduction blocks remaining in the main memory 130 is equal to or less than a predetermined threshold, the interrupt signal may be generated and output, or the time point when the reproduction blocks stored in the main memory 130 are all processed may be calculated using the transmission rate of the reproduction blocks transmitted from the main memory 130 to the codec 140 and the interrupt signal may be generated and output at the time point.

Here, it has been stated that the state of the core 112 is controlled by the interrupt signal generated by the control unit 110 or the interrupt signal generated by the interface 114, but the states of other blocks may be controlled. All the blocks may be controlled by other interrupt signals other than the interrupt signal generated by the control unit 110 and the interrupt signal generated by the interface 114.

The auxiliary memory 120 is a device storing multimedia data. The auxiliary memory 120 may be a nonvolatile memory such as a hard disk, a NOR flash, a NAND flash, a T flash, an SD card, and a CF card.

The multimedia data may be a multimedia file or a part thereof such as an audio file having formats of MP3, WAV, RM, OGG, M4A, AC3, and the like, a video file having formats of AVI, FLV, MKV, WMA, MP4, and the like, and an audio file or vide file having formats corresponding to the characteristic of the portable terminal.

Referring to FIG. 4, one or more multimedia files may be stored in the auxiliary memory 120, and a reproduction list for determining the reproduction order of the one or more multimedia files may be stored therein.

Each multimedia file may be divided into one or more multimedia data blocks. The multimedia data blocks constituting one multimedia file are sequentially transmitted to the core 112 from the auxiliary memory 120 via the interface 114 and are decoded, whereby the reproduction blocks are generated.

The main memory 130 is a device storing the reproduction blocks decoded by the core 112. The main memory 130 may be a volatile memory such as a RAM, a DRAM, an SDRAM, and an SRAM. The main memory 130 stores data only when the portable terminal 100 is supplied with power, and deletes the data from a storage area when the supply of the power is stopped.

The main memory 130 stores one or more reproduction blocks decoded by the core 112 when the core 112 is in the ON state. When the core 112 is in the OFF state, the stored reproduction blocks are sequentially transmitted to the codec 140 via the interface 114.

The codec 140 converts the reproduction blocks which are decoded digital data stored in the main memory 130 into analog signals using a digital-to-analog converter (DAC) 142.

Here, the DAC 142 converts the reproduction blocks as digital data into analog signals.

The codec 140 may be a video codec such as DivX, MPEG, AVC, and H.264 when the multimedia data is associated with a video file, and may be a sound codec such as ADPCM, ATRAC, WMA, FLAC, and Dolby digital when the multimedia data is associated with an audio file.

The codec 140 may include a switch 144. The switch 144 serves to determine the output direction of the analog signal generated by the DAC 142 to a speaker 155 or an earphone 160 when the reproduction block is obtained by decoding an audio file. The codec 140 may receive analog data from the outside via a microphone 150 and may transmit the received analog data to the control unit 110.

The portable terminal 100 may further include elements such as an input unit 165, a display unit 170, and a communication unit 175 to provide various optional functions such as a voice call function, a game function, a short messaging function, a wireless Internet function, an E-mail function, a music play function, a video play function, and a camera function.

The input unit 165 is a device such as a key pad and a key button, and enables a user to input data to the portable terminal 100. The display unit 170 is a display for displaying state information, a character message, a video, or a still image produced in the course of operation of the portable terminal 100. When the display unit 170 includes a touch screen, the display unit also serves as the input unit 165.

The communication unit 175 processes data transmitted and received via an antenna and enables the portable terminal 100 to access a communication network and to make a voice communication and a data communication.

Figure 5:
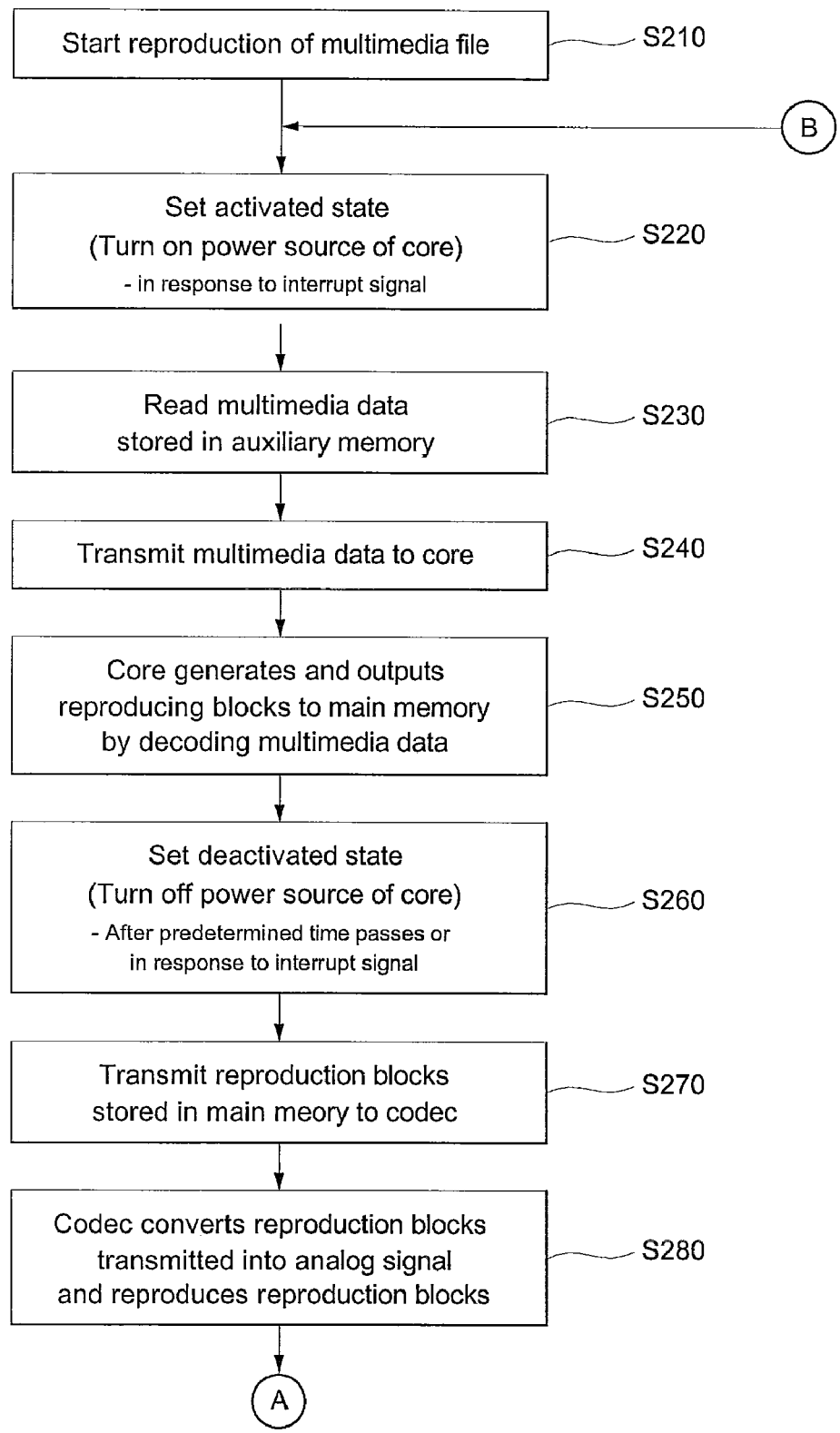
FIGS. 5 and 6 are flowcharts illustrating a multimedia data reproducing method in a multimedia data reproducing device according to an exemplary embodiment of the invention.
Figure 6:
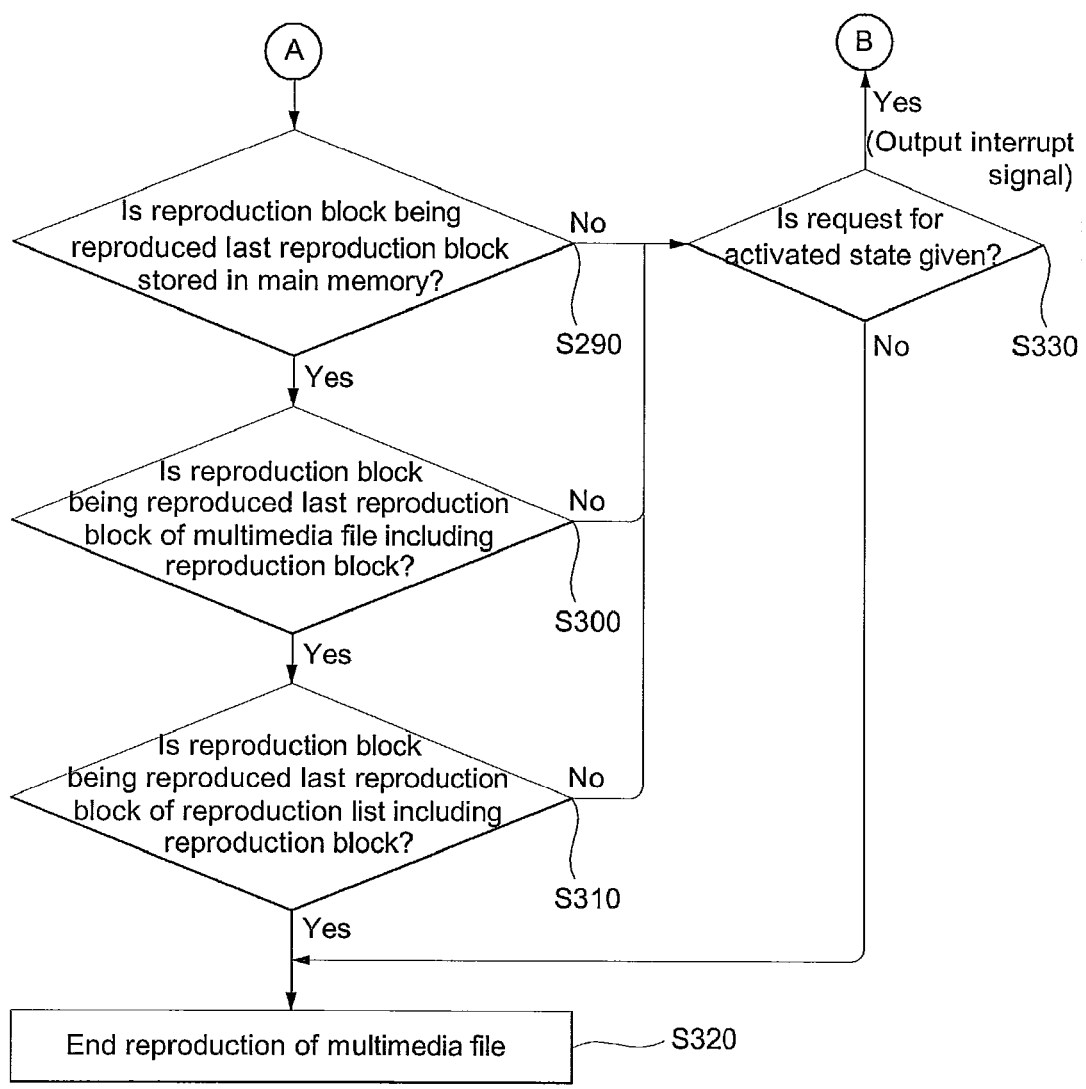

FIGS. 5 and 6 are flowcharts illustrating a multimedia data reproducing method of a multimedia data reproducing device according to an exemplary embodiment of the invention.

Power is supplied to the portable terminal 100, and the reproduction of a multimedia file such as a video file or an audio file is started by a user's selection (step S210).

When the control unit 110 is in the activated state, the power source of the core 112 is turned on to set the core 112 to the ON state (step S220).

The interface 114 reads the multimedia data stored in the auxiliary memory 120 (step S230). The read multimedia data may be data relating to a specific part such as a start part or a middle part of the multimedia file selected by the user, or may be data relating to a part being reproduced when the reproduction of the multimedia file is previously ended and being able to be reproduced subsequently from the ended part.

Since the core 112 is presently in the ON state, the interface 114 transmits the multimedia data read from the auxiliary memory 120 to the core 112 (step S240).

The core 112 generates the reproduction blocks by decoding the transmitted multimedia data and outputs the generated reproduction blocks to the main memory 130 (step S250).

The amount of multimedia data read in step S230 may be set in advance, and may be an amount which can be decoded for a predetermined time by the core 112 and thus can guarantee a sufficient time until the next decoding operation. For example, when the core 112 can generate a reproduction block in the unit of 10 seconds by one decoding operation, the core 112 decodes the multimedia data corresponding to the data amount for generating the reproduction block in the unit of 10 seconds in the ON state, and the decoding time may be shorter than the reproduction time of the decoded reproduction block.

Alternatively, the processes of steps S230 to S250 may be repeatedly performed for a predetermined time when the core 112 is in the ON state or until the interrupt signal output from the control unit 110 or the interface 114 turns off the core 112.

After a predetermined time passes or by the use of the interrupt signal, the control unit 110 is deactivated to turn off the power source of the core 112, whereby the core 112 is switched to the OFF state (step S260).

Since the control unit 110 is presently in the deactivated state, the reproduction blocks stored in the main memory 130 is transmitted to the codec 140 via the interface 114 (step S270).

The codec 140 converts the transmitted reproduction blocks into analog signals and reproduces the reproduction blocks (step S280).

It is determined whether the present reproduction block being reproduced by the codec 140 is a last reproduction block stored in the main memory 130 (step S290). When it is determined in step S290 that the present reproduction block is not the last reproduction block, the process of step S330 is performed.

When it is determined that the present reproduction block is the last reproduction block, it is determined whether the reproduction block is a last reproduction block of the multimedia file including the reproduction block (step S300). When it is determined in step S300 that the reproduction block is not the last reproduction block, the process of step S330 is performed.

When it is determined that the present reproduction block is the last reproduction block, it is determined whether the present reproduction block is a last reproduction block of the reproduction list including the present reproduction block (step S310). When it is determined in step S310 that the present reproduction block is not the last reproduction block, the process of step S330 is performed.

When it is determined that the present reproduction block is the last reproduction block, the reproduction of the multimedia file is ended in step S320.

Here, it is shown and described that steps S290, S300, and S310 are sequentially performed, only one or more steps may be selectively performed as needed, or the steps may be performed regardless of the order.

In step S330, the control unit 110 may be switched to the activated state and the deactivated state by the interrupt signal generated by the control unit 110 or the interrupt signal generated by the interface 114. That is, the mode of the core 112 may be switched to the ON state and the OFF state. That is, the control unit 110 determines whether a request for switching to the activated state is given. When the reproduction block being presently reproduced by the codec 140 is not the last reproduction block stored in the main memory 130, or is not the last reproduction block of the multimedia file including the present reproduction block, or is not the last reproduction block of the reproduction list including the present reproduction block, it is determined that the request for switching the control unit 110 to the activated state is given, and the core 112 is switched to the ON state. The mode of the core 112 is switched from the OFF state to the ON state by the interrupt signal and the steps subsequent to step S230 are sequentially repeated.

Here, the interrupt signal may be generated and output with a predetermined period or at a time point depending on the amount of reproduction blocks remaining in the main memory 130 or the transmission rate of the reproduction blocks from the main memory 130 to the codec 140.

Here, it is preferable that the time T1 of steps S230 to S250 performed when the core 112 is in the ON state is shorter than the time T2 of steps S270 to S280 performed when the core 112 is in the OFF state. That is, since the time when the core 112 is in the ON state is much shorter than the time when the core is in the OFF state, the power source of the core 112 is turned on only for the time necessary for the decoding, thereby minimizing the power consumption.

It has been stated in this embodiment that the control unit 110 controls the states of the core 112 by the use of the interrupt signal generated by the control unit 110 or the interface 114, but the control unit 110 may control the states of the core 112 by the use of interrupt signals generated by other elements.

The above-mentioned multimedia data reproducing method may be carried out in time series by a software program built in a portable terminal. Codes and code segments of the program will be easily obtained by programmers skilled in the art. The program can be stored in a computer-readable recording medium and can be read and executed by a computer to embody the above-mentioned method. The recording medium includes a magnetic recording medium, an optical recording medium, and a carrier wave medium.

In another embodiment of the invention, one of a clock speed control method and a core power source control method may be selected depending on a semiconductor process or a characteristic of a portable terminal and may be applied to the portable terminal at the time of reproducing multimedia data.

According to the clock speed control method, the clock speed of the core is raised only when it is intended to activate the control unit, and the clock speed is lowered when it is intended to deactivate the control unit. According to the core power source control method, as described above, the power source of the core is turned on only when it is intended to activate the control unit, and the power source of the core is turned off when it is intended to deactivate the control unit.

When the semiconductor process is a general process where the leakage current is greatly different depending on the clock speed, the clock speed control method is selected. At this time, the clock speed of the core is raised when it is necessary to activate the control unit for the decoding operation at the time of reproducing multimedia data, and the clock speed of the core is lowered when a predetermined amount of decoded reproduction blocks are stored in the main memory and it is necessary to deactivate the control unit.

When the semiconductor process is a fine process where the leakage current is greatly different depending on the clock speed, the core power source control method is selected. At this time, the power source of the core is turned on when it is necessary to activate the control unit for the decoding operation at the time of reproducing multimedia data, and the power source of the core is turned off when a predetermined amount of decoded reproduction blocks are stored in the main memory and it is necessary to deactivate the control unit.

When the core causes a processor requiring a low-speed clock to work at the same time as reproducing the multimedia data, the power source of the core cannot be turned off depending on the characteristic of the portable terminal. In this case, the clock speed control method may be selected instead of the core power source control method, thereby reducing the power consumption of a battery at the time of reproducing multimedia data.

While the invention has been described with reference to the exemplary embodiments, it will be understood by those skilled in the art that the invention can be modified and changed in various forms without departing from the spirit and scope of the invention described in the appended claims.

What is claimed is:

1. A multimedia data reproducing device comprising:
   a codec converting transmitted digital data into an analog signal by a predetermined method and reproducing the analog signal; and
   a control unit including a core generating a reproduction block by decoding multimedia data and outputting the generated reproduction block to a main memory in an activated state and an interface transmitting the reproduction block stored in the main memory as the digital data to the codec and transmitting the multimedia data stored in an auxiliary memory to the core in an activated state.

2. The multimedia data reproducing device according to claim 1, wherein the power sources of the core and the interface are turned on when the control unit is in an activated state and only the power source of the interface is turned on to reduce the power consumption when the control unit is in a deactivated state.

3. The multimedia data reproducing device according to claim 1, wherein the control unit or the interface unit generates an interrupt signal periodically alternating between an activated state and a deactivated state or an interrupt signal alternating between an activated state and a deactivated state depending on an amount of the reproduction block remaining in the main memory or a transmission rate of the reproduction block from the main memory to the codec.

4. The multimedia data reproducing device according to claim 3, wherein the core further includes an interrupt module which is turned on even when the power source of the core is turned off, and
   wherein the interrupt module turns on the power source of the core in response to the interrupt signal.

5. The multimedia data reproducing device according to of claim 3, wherein the control unit turns on the power source of the core in response to the interrupt signal.

6. The multimedia data reproducing device according to claim 1, wherein the interface transmits the reproduction block stored in the main memory to the codec even when the control unit is in a deactivated state.

7. The multimedia data reproducing device according to claim 1, wherein the control unit selects one of a clock speed control method and a core power source control method depending on a semiconductor process or a characteristic of a portable terminal including the multimedia data reproducing device.

8. A multimedia data reproducing method in a multimedia data reproducing device, comprising:
  (a) setting a control unit to an activated state;
  (b) causing an interface to read multimedia data stored in an auxiliary memory and transmit the read multimedia data to a core;
  (c) causing the core to generate a reproduction block by decoding the multimedia data and to output the reproduction block to a main memory;
  (d) setting the control unit to a deactivated state;
  (e) transmitting the reproduction block stored in the main memory to a codec; and
  (f) causing the codec to reproduce the reproduction block.

9. The multimedia data reproducing method according to claim 8, wherein the time of performing the steps of (b) to (c) is shorter than the time of performing the steps of (e) to (f).

10. The multimedia data reproducing method according to claim 8, further comprising:
  (g) determining whether the reproduction block is a last reproduction block stored in the main memory;
  (h) checking whether a request for switch to an activated state is given when it is determined in the step of (g) that the reproduction block is not the last reproduction block; and
  (i) performing the step of (a) again when the request is given.

11. The multimedia data reproducing method according to claim 8, further comprising:
  (g) determining whether the reproduction block is a last reproduction block in a multimedia file including the multimedia data;
  (h) checking whether a request for switch to an activated state is given when it is determined in the step of (g) that the reproduction block is not the last reproduction block; and
  (i) performing the step of (a) again when the request is given.

12. The multimedia data reproducing method according to claim 8, further comprising:
  (g) determining whether the reproduction block is a last reproduction block in a reproduction list including the multimedia data;
  (h) checking whether a request for switch to an activated state is given when it is determined in the step of (g) that the reproduction block is not the last reproduction block; and
  (i) performing the step of (a) again when the request is given.

13. The multimedia data reproducing method according to claim 8, wherein the step of (a) is performed in response to an interrupt signal periodically generated and output by the control unit or the interface.

14. The multimedia data reproducing method according to claim 8, wherein the step of (a) is performed in response to an interrupt signal generated and output by the control unit or the interface depending on an amount of reproduction block remaining in the main memory or a transmission rate of the reproduction block to the codec.

15. A recording medium having recorded thereon a program which can be read by a digital processor and in which command words executable by the digital processor are materially described so as to carry out the multimedia data reproducing method according to claim 8.

* * * * *